(12) United States Patent
Lee et al.

(10) Patent No.: US 7,328,580 B2
(45) Date of Patent: Feb. 12, 2008

(54) CHEVRON FILM COOLED WALL

(75) Inventors: Ching-Pang Lee, Cincinnati, OH (US); Steven Robert Brassfield, Cincinnati, OH (US); Ronald Scott Bunker, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 731 days.

(21) Appl. No.: 10/874,900

(22) Filed: Jun. 23, 2004

(65) Prior Publication Data

US 2005/0286998 A1 Dec. 29, 2005

(51) Int. Cl.
*F23R 3/42* (2006.01)

(52) U.S. Cl. .......................... 60/752; 415/115; 415/116

(58) Field of Classification Search ............... 60/752, 60/754, 759, 265, 266; 415/115, 116; 416/96 R, 416/97 R
See application file for complete search history.

(56) References Cited

U.S. PATENT DOCUMENTS

| | | |
|---|---|---|
| 4,197,443 A | 4/1980 | Sidenstick |
| 4,529,358 A | 7/1985 | Papell |
| 4,650,949 A | 3/1987 | Field |
| 4,653,983 A | 3/1987 | Vehr |
| 4,664,597 A | 5/1987 | Auxier et al. |
| 4,672,727 A | 6/1987 | Field |
| 4,738,588 A | 4/1988 | Field |
| 4,762,464 A | 8/1988 | Vertz et al. |
| 5,062,768 A | 11/1991 | Marriage |
| 5,096,379 A | 3/1992 | Stroud et al. |
| 6,234,755 B1 | 5/2001 | Bunder et al. |
| 6,307,175 B1 * | 10/2001 | Blochlinger et al. ... 219/121.71 |

FOREIGN PATENT DOCUMENTS

EP 1 326 007 A2 7/2003

* cited by examiner

*Primary Examiner*—Devon C. Kramer
*Assistant Examiner*—Vikansha Dwivedi
(74) *Attorney, Agent, or Firm*—William S. Andes; Francis L. Conte

(57) ABSTRACT

A wall in a gas turbine engine includes inner and outer surfaces having a row of compound chevron film cooling holes extending therethrough. The chevron holes diverge both longitudinally and laterally between an inlet at the wall inner surface and a chevron outlet at the wall outer surface.

31 Claims, 5 Drawing Sheets

CHEVRON FILM COOLED WALL

The U.S. Government may have certain rights in this invention pursuant to contract number F33615-02-C-2212 awarded by the U.S. Department of the Air Force.

BACKGROUND OF THE INVENTION

The present invention relates generally to gas turbine engines, and, more specifically, to film cooling therein.

In a gas turbine engine air is pressurized in a compressor and mixed with fuel in a combustor for generating hot combustion gases. Energy is extracted from the gases in a high pressure turbine (HPT) which powers the compressor, and in a low pressure turbine (LPT) which powers a fan in a turbofan aircraft engine application, or powers an external shaft for marine and industrial applications.

Engine efficiency increases with temperature of combustion gases, but the combustion gases heat the various components along their flowpath, which in turn requires cooling thereof for obtaining a long life of the engine. The flowpath components subject to the hot combustion gases are cooled by bleeding air from the compressor which correspondingly reduces engine efficiency since the bled air is not used in the combustion process.

Accordingly, gas turbine engine cooling art is mature and includes innumerable patents for minute differences in cooling circuits and features in the various components of the hot flowpath.

For example, the combustor includes radially outer and inner liners which require cooling during operation. Turbine nozzles include hollow vanes supported between outer aid inner bands which also require cooling. Turbine rotor blades are hollow and typically include cooling circuits therein, with the blades being surrounded by turbine shrouds which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine, but all these components typically include common rows of film cooling holes.

A typical film cooling hole is a cylindrical bore inclined at a shallow angle through the heated wall for discharging a film of cooling air along the external surface of the wall to provide thermal insulation against the hot combustion gases which flow thereover during operation. The film is discharged at a shallow angle over the wall outer surface to minimize the likelihood of undesirable blow-off thereof which would lead to flow separation and a loss of the film cooling effectiveness.

Furthermore, the film cooling holes are typically arranged in rows of closely spaced apart holes which collectively provide a large area cooling air blanket over the external surface.

However, the more holes required for providing full-surface coverage of the film cooling boundary layer, the more air is also required which therefore decreases engine efficiency.

Accordingly, the art of film cooling holes itself is replete with numerous patents on the minute details of various forms of those holes for improving their efficiency for maintaining flow attachment with the widest possible lateral dispersion. For example, the discharge end of the simple cylindrical film cooling bore may diverge to the outer surface of the wall being cooled for diffusing the pressurized cooling air as it is discharged from the outlet. Diffusion is an aerodynamic mechanism in which the high velocity of the pressurized cooling air is reduced which in turn increases its pressure.

Diffusion outlets for typical film cooling holes decrease the discharge velocity thereof for ensuring good flow attachment or the discharged film cooling air without undesirable flow separation. And, the lateral width of the diffusion outlet correspondingly increases the lateral flow coverage of the film.

However, diffusion in film cooling holes has a typical limit due to the diverging half-angle of the diffusion outlet to prevent undesirable flow separation. For example, the diffusion angle is typically limited to about ten degrees on each side of the diffusion outlet to prevent overexpansion of the discharge cooling air which could lead to undesirable film separation.

Accordingly, it is desired to provide an improved film cooling hole having increased film coverage while maintaining good flow attachment of the discharged film cooling air.

BRIEF DESCRIPTION OF THE INVENTION

A wall in a gas turbine engine includes inner and outer surfaces having a row of compound chevron film cooling holes extending therethrough. The chevron holes diverge both longitudinally and laterally between an inlet at the wall inner surface and a chevron outlet at the wall outer surface.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
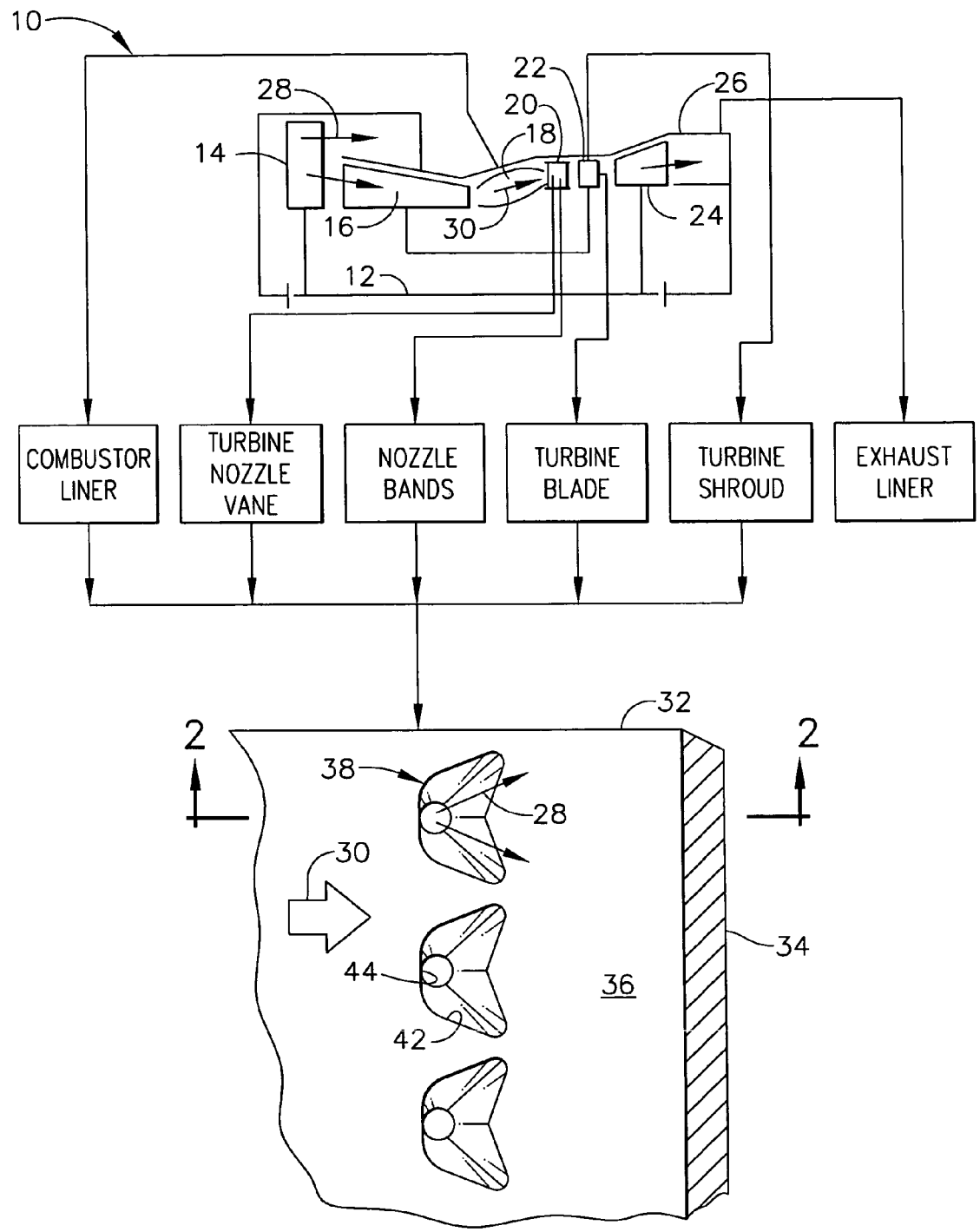
FIG. 1 is a schematic representation of an exemplary gas turbine engine having various components each including a heated wall cooled by a row of compound chevron film cooling holes in accordance with an exemplary embodiment.

Illustrated schematically in FIG. 1 is a gas turbine engine 10 which is axisymmetrical about a longitudinal or axial centerline axis 12. The engine includes in serial flow communication a fan 14, multistage axial compressor 16, and an annular combustor 18 followed in turn by a high pressure turbine (HPT) and a low pressure turbine (LPT).

The HPT includes a turbine nozzle 20 having a row of hollow stator vanes supported in inner and outer nozzle bands. A first stage turbine 22 follows the first stage turbine nozzle and includes a row of hollow rotor blades extending radially outwardly from a supporting rotor disk and surrounded by an annular turbine shroud.

A low pressure turbine (LPT) 24 follows the high pressure turbine and includes additional nozzles and rotor blades which may or may not include internal cooling circuits depending upon the engine design. An exhaust liner 26 follows the low pressure turbine.

During operation, ambient air 28 is pressurized by the fan 14, and lower portion of which enters the compressor 16 for additional pressurization, while the outer portion is discharged from a fan outlet for providing propulsion thrust in a turbofan engine application. The air pressurized in the compressor is mixed with fuel in the combustor for generating hot combustion gases 30. The combustion gases flow through the various turbine blade stages which extract energy therefrom for powering the compressor and fan during operation.

The exemplary turbofan engine 10 illustrated in FIG. 1 may have any conventional configuration and operation, but is modified as a herein described for introducing improved film cooling. Any one or more of the various engine components disclosed above which are subject to heating from the hot combustion gases 30 may be suitably cooled by bleeding a portion of the pressurized air from the compressor 16 during operation.

In this regard, any one of those heated components which require cooling will include a thin metal wall 32, a portion of which is illustrated in FIG. 1 as representative of the various components of the engine in which film cooling may be utilized.

The thin wall 32 is typically formed of a conventional superalloy metal, such as a cobalt-based material, having high strength at the elevated temperatures experienced in operation of the gas turbine engine due to heating from the hot combustion gases 30.

Figure 2:
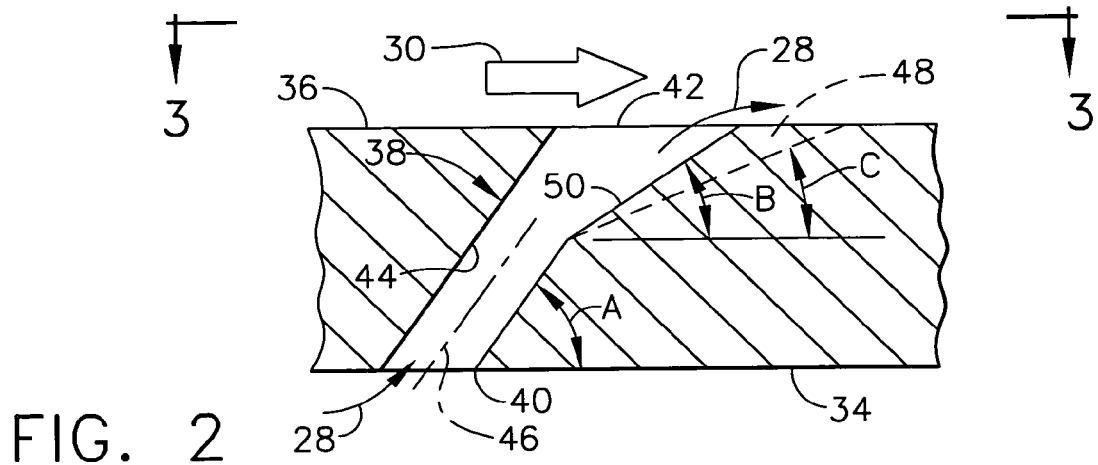
FIG. 2 is a transverse sectional view through one of the chevron holes illustrated in FIG. 1 and taken along line 2-2.

The flowpath component or wall 32 is illustrated in part in plan view in FIG. 1, and in lateral sectional view in FIG. 2, and includes opposite inner and outer wall surfaces 34,36. The inner or inboard surface of the wall forms the outer boundary of a suitable cooling circuit provided in the component which receives air bled from the compressor in any conventional manner. The outer surface 36 is exposed to the hot combustion gases 30 during operation and requires suitable film cooling protection.

The exemplary component wall 32 illustrated in FIGS. 1 and 2 may be in the form of the inner or outer combustor liners, the turbine nozzle vanes, the turbine nozzle bands, the turbine rotor blades, the turbine shroud, or the exhaust liner, for typical examples, which utilize various forms of film cooling holes therein.

However, FIGS. 1 and 2 illustrate a new form of film cooling hole 38 arranged in a suitable row along the applicable span of the component. The film cooling holes 38 are uniquely identified by their compound chevron or delta configurations.

Figure 3:
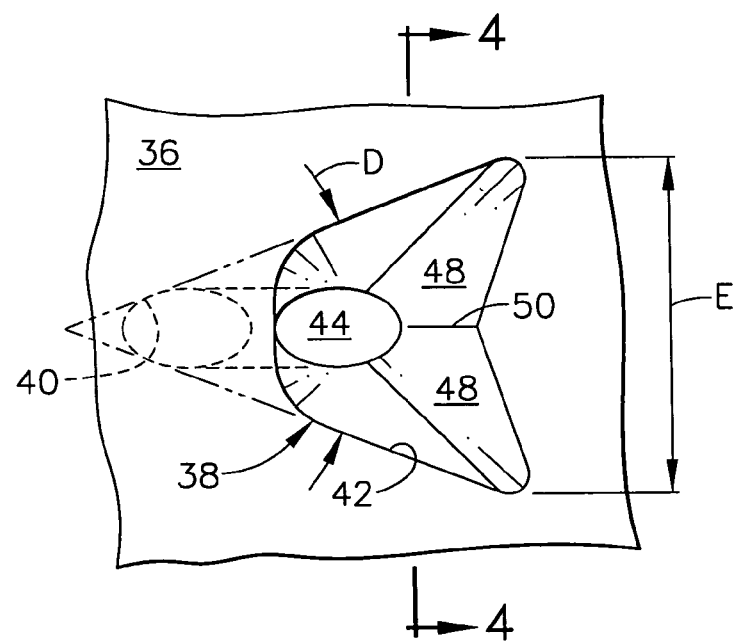
FIG. 3 is a plan view of the inclined chevron hole illustrated in FIG. 2 and taken along line 3-3.
Figure 4:
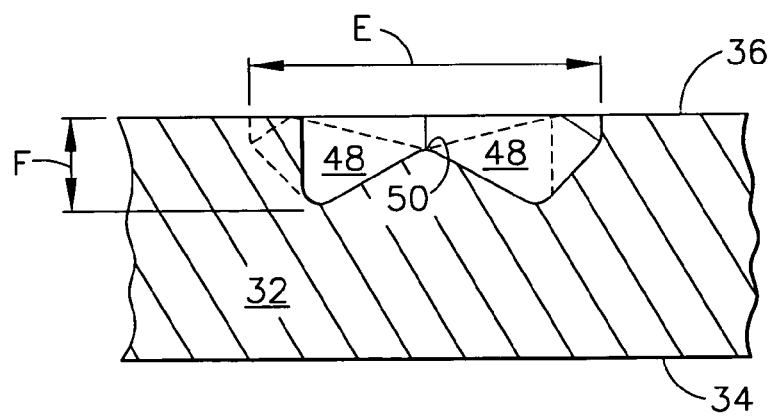
FIG. 4 is a lateral sectional view through the chevron outlet illustrated in FIG. 3 and taken along line 44.

More specifically, an exemplary one of the chevron holes 38 is illustrated in more detail in FIGS. 2-4 and extends longitudinally through the wall and diverges both longitudinally along the hole and laterally across the width of the hole between an inlet 40 disposed flush at the inner surface 34, and a chevron outlet 42 disposed flush at the outer surface 36.

Each of the chevron holes 38 includes a preferably cylindrical inlet bore 44 having a substantially constant flow area from its inlet to outlet ends. As shown in FIG. 2, the inlet bore has a longitudinal or axial centerline axis 46, and the bore is inclined at a shallow inclination angle A through the wall relative to its inner or outer surfaces which are typically parallel with each other. For example, the inclination angle A of the inlet bore may be conventional with those used for typically inclined film cooling holes, such as about 20 to 45 degrees for example.

The inlet bore 44 illustrated in FIGS. 2 and 3 terminates at its outlet end in a pair of chevron or wing troughs or recesses 48, which are open outwardly to the surrounding wall outer surface 36. The two troughs 48 as illustrated in FIGS. 2-4 have a common apex or ridge 50 which is preferably centered on the bore exit.

As indicated above, the inlet bore 44 of the chevron holes is inclined at a suitable shallow inclination angle A from the wall inner surface 34 along which it receives the pressurized air 28 from the compressor for cooling the wall during operation. As shown in FIG. 2, the wing troughs 48 similarly diverge longitudinally between the discharge end of the inlet bore 44 and the wall outer surface 36 as represented by the difference in inclination angle B for the center ridge 50 and the inclination angle C of the bottom of each trough.

Furthermore, the two troughs 48 also diverge laterally as illustrated in FIG. 3 by the included angle D between the outboard edges thereof as the troughs increase in lateral width E axially along the common ridge 50.

As initially shown in FIG. 2, the inlet bore 44 preferably terminates with its exit located below the wall outer surface 36, and where the chevron outlet 42 begins. The two troughs 48 then decrease in depth F as illustrated in FIG. 4 along the ridge 50 from the bore 44 to the chevron outlet 42 to blend flush with the wall outer surface 36.

As best illustrated in FIGS. 2 and 4 together, the two troughs 48 diverge from the common ridge 50 with their depths increasing over the axial length of the ridge due to the difference in inclination angles B,C. The nominal inclination angle A of the inlet bore 44 may be about 20 to 45 degrees, whereas the inclination angle B of the ridge 50 is suitably smaller so that the ridge intersects the outer surface 36 at an even shallower discharge angle than the inlet bore 44. And, the inclination angle C of the valley or base of the trough 48 is further smaller than the inclination angle B of the ridge for intersecting the wall outer surface 36 at an even shallower discharge angle along the trailing edge of the chevron outlet.

FIGS. 3 and 4 illustrate the compound delta or chevron configuration of the film cooling holes by their unique double triangular configurations. In FIG. 3, the two chevron or wing troughs 48 diverge laterally from the common inlet bore 44 and have a generally triangular or chevron configuration along their trailing edge. In FIG. 4, the two troughs 48 extend deeper into the wall than the common ridge 50 therebetween and define yet another triangular configuration of the common ridge therebetween, or the two triangular troughs on opposite sides thereof.

As collectively shown in FIGS. 2-4, the chevron outlet 42 increases in lateral width E longitudinally along the center ridge 50 as the ridge decreases in depth F from the outer surface. The differently inclined troughs 48 and center ridge 50 may be used to advantage for increasing the lateral width E of the chevron outlet 42 to maximize diffusion of the discharged cooling air with minimal or no flow separation of the cooling air channeled through the chevron holes during operation.

The half-angle D/2 for the divergence of each outboard edge of the two troughs 48 illustrated in FIG. 3 may fall within the typical diffusion limits of about ten degrees, while obtaining a substantial increase in the overall width E of the chevron outlet at its trailing edge due to the alternating troughs 48 and center ridge 50 therebetween.

For example, the chevron holes 38 may increase in flow area from the inlet bores 44 to their chevron outlets 42 along the wall outer surface in the typical fashion of a diffusion hole, with the flow area of that hole being distributed along the two triangular troughs 48 of each outlet interrupted by the intervening ridge 50. The discharged film cooling air is therefore forced to flow along both troughs 48 and over the common ridge 50 and is protected within the shallow recess of the troughs as the flow is discharged therealong to meet the combustion gases upon discharge along the outer surface of the wall. The so-discharged cooling air enjoys the additional advantage of the shallower inclination angle C of the troughs where they blend with the wall outer surface.

In this way, maximum diffusion of the pressurized cooling air jets being discharged through the inlet bores 44 may be obtained in the chevron outlets 42 as the air is spread laterally along the increasing width of the two troughs to form a large width film cooling layer along the elongated trailing edge of the outlet. A substantial increase in film cooling coverage may be obtained by the increase in lateral width E of the chevron outlet, along with improved flow attachment of the discharged film cooling air joining the wall outer surface at the shallower discharge angles B,C which are smaller than the initial inclination angle A of the inlet bore 44.

In the exemplary embodiment illustrated in FIG. 3, the ridge 50 terminates at the wall outer surface 36 forward or upstream of the location where the two troughs 48 terminate at the outer surface. This V configuration emphasizes the chevron or delta shape of the chevron outlet 42 in lateral width as viewed from outside the wall. Furthermore, the ridge 50 is preferably straight longitudinally between the inlet bore and the outer surface 36, or could have other shapes if desired.

As shown in FIG. 4, the center ridge 50 is preferably triangular in depth laterally between the two outboard wing troughs 48, and those wing troughs 48 are preferably longitudinally symmetrical along the common ridge 50. In this configuration, the common ridge 50 is triangular both in transverse sectional view, as well as being triangular along its two side faces which correspond with inboard faces of the two outboard troughs 48, whose outboard surfaces are similarly triangular.

The various faces of the two troughs 48 and common ridge 50 therebetween are all relatively flat in the exemplary embodiment, and joined together at suitable arcuate fillets therebetween. The inboard surfaces are laterally inclined along the ridge 50, whereas the outboard surfaces may be normal to or inclined relative to the wall outer surface 36.

Figure 5:
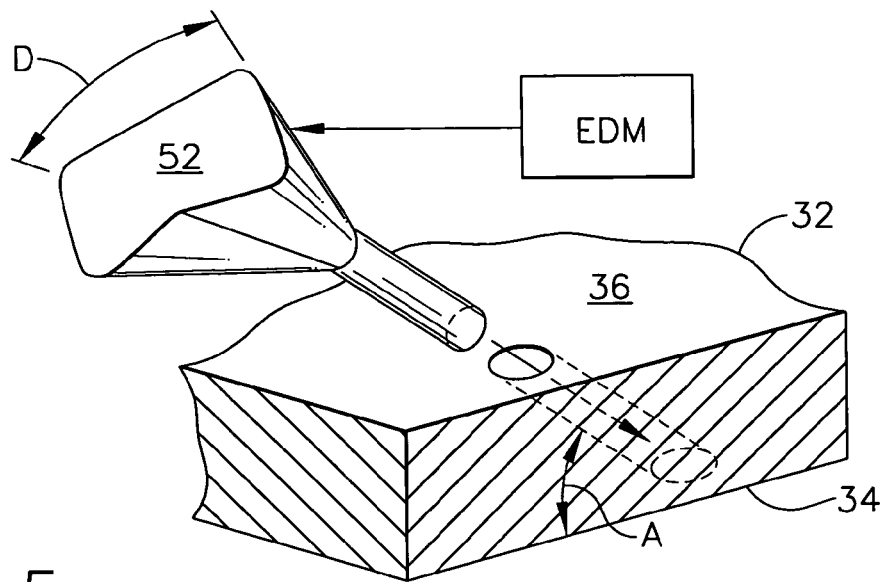
FIG. 5 is a schematic representation of an electrical discharge machining (EDM) electrode used for forming the chevron hole illustrated in FIGS. 1-4.

For example, FIG. 5 illustrates an electrical discharge machining (EDM) electrode 52 specifically configured for machining the complex 3-D shape of the chevron holes 38 illustrated in FIGS. 2-4. The electrode includes a cylindrical stem matching the intended diameter of the inlet bore 44 illustrated in FIG. 2 disposed generally coaxially with a rectangular base end diverging at the included angle D, and having a W-shaped lower surface that defines the two V-shaped wing troughs 48 and the triangular ridge 50 illustrated in FIG. 4. By simply inserting the electrode 52 through the wall 32 at the shallow inclination angle A for the inlet bore, that bore and the resulting complex double chevron outlet 42 illustrated in FIGS. 2-4 may then be formed in the wall in a single manufacturing operation for each of the many film cooling holes required.

Figure 6:
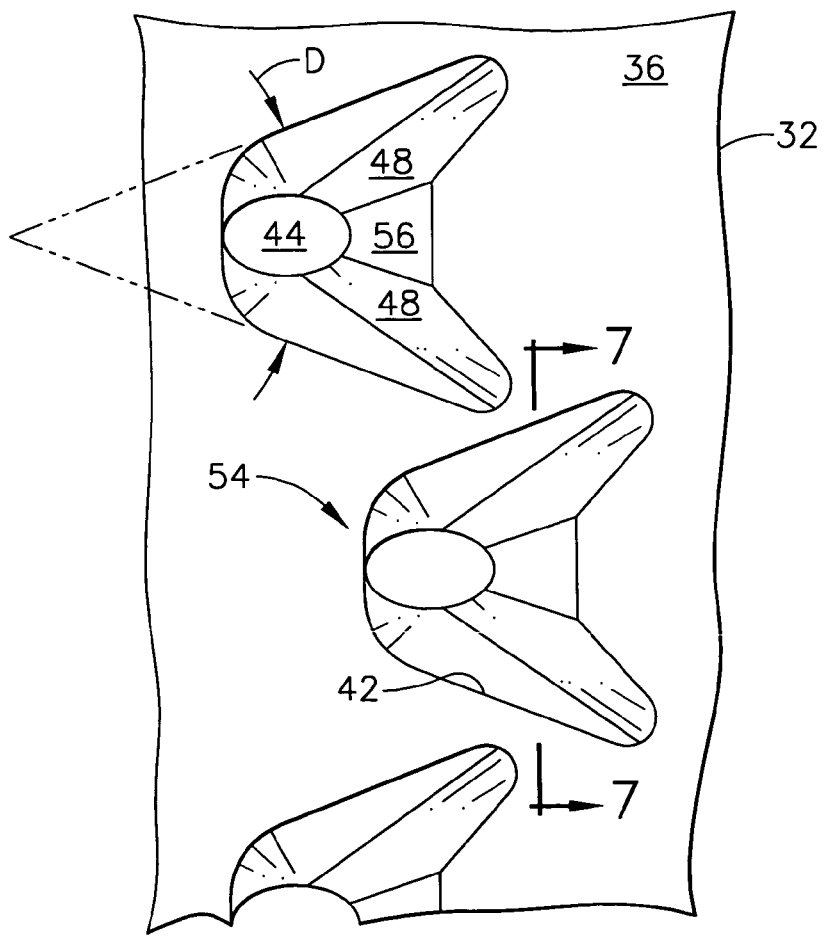
FIG. 6 is a plan view, like FIG. 3, of a row of chevron holes in accordance with another embodiment.
Figure 7:
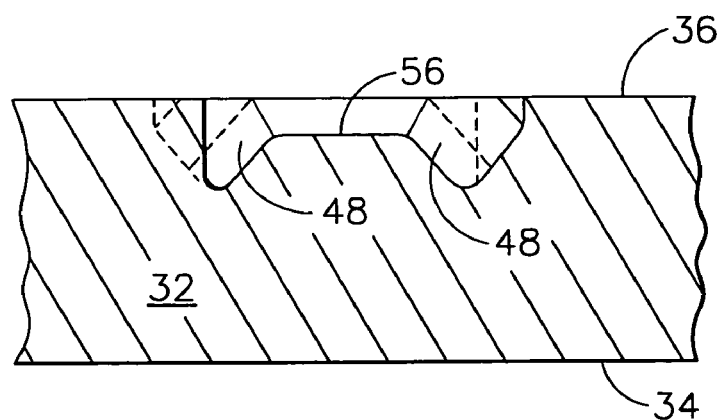
FIG. 7 is a transverse sectional view through the chevron outlet illustrated in FIG. 6 and taken along line 7-7.

FIGS. 6 and 7 illustrate another form of the compound chevron film cooling hole designated 54 which is similar to the original chevron hole but includes a ridge 56 which is truncated in elevation flat laterally between the two wing troughs 48.

In the FIG. 4 embodiment disclosed above, the outboard walls of the two troughs 48 are vertical or normal to the outer surface 36, with the ridge 50 being defined by two triangular planes that correspondingly define the two bottom planes of the two troughs 48. In FIGS. 6 and 7, the triangular ridge 50 of FIG. 4 may be truncated in elevation to form a truncated ridge 56 which correspondingly defines a three-plane configuration of the chevron outlet.

As shown in FIG. 6, the flat ridge 56 separating the two triangular troughs 48 is itself triangular between the inlet bore 44 and its downstream or trailing edge at the outer surface 36. In this way, the flat ridge 56 is recessed below the outer surface of the wall and provides an additional area in which the discharge cooling air may diffuse prior to reaching the outer surface of the wall.

The flat ridge 56 illustrated in FIG. 7 may have a suitable shallow inclination angle B like that illustrated in FIG. 2, with the bottoms of the two troughs 48 having the shallower inclination angle C as also illustrated in FIG. 2. The discharged cooling air may therefore be diffused along the width and depth of the compound chevron outlet and distributed laterally in width, with good flow attachment as it flows over the trailing edge of the chevron outlet to the outer surface of the wall.

Figure 8:
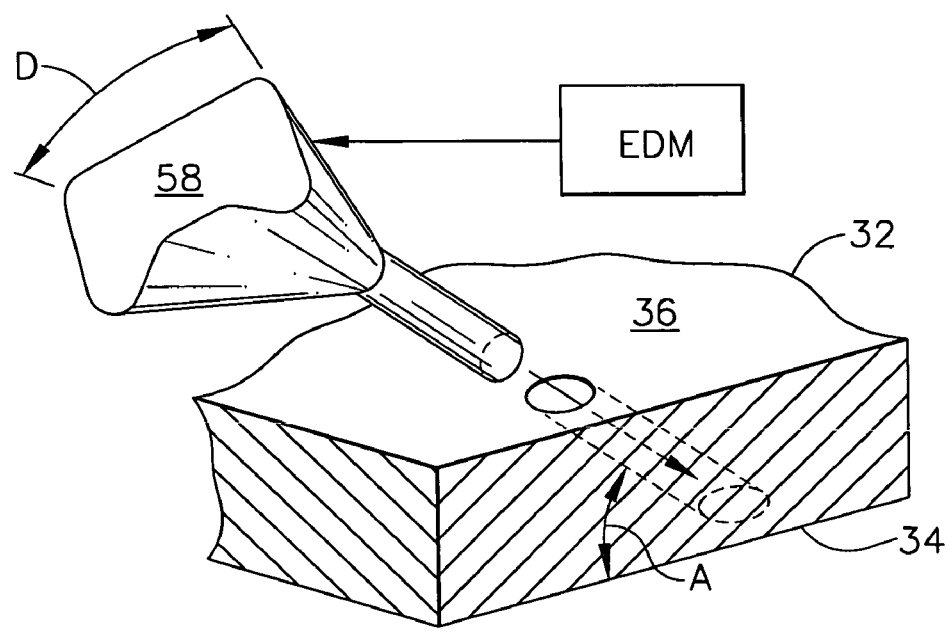
FIG. 8 is a schematic view, like FIG. 5, of an EDM electrode for forming the chevron hole illustrated in FIGS. 6 and 7.

FIG. 8 illustrates the form of the EDM electrode 58 specifically configured for machining the chevron hole 54 illustrated in FIGS. 6 and 7. Again, the electrode 58 includes a cylindrical stem for machining the cylindrical inlet bore 44, followed in turn by a diverging rectangular base having the included angle D, with a three-plane lower surface for machining the flat ridge 56 and two adjacent triangular troughs 48 with two vertical outboard walls.

Figure 9:
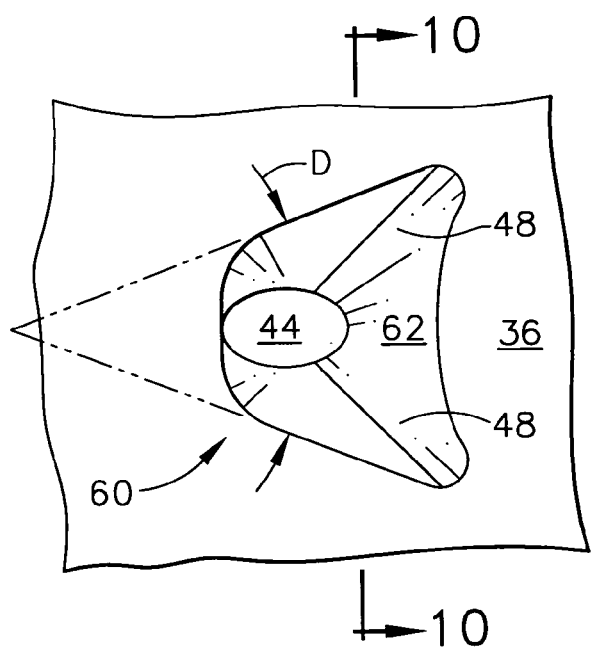
FIG. 9 is plan view, like FIG. 3, of a chevron hole in accordance with another embodiment.
Figure 10:
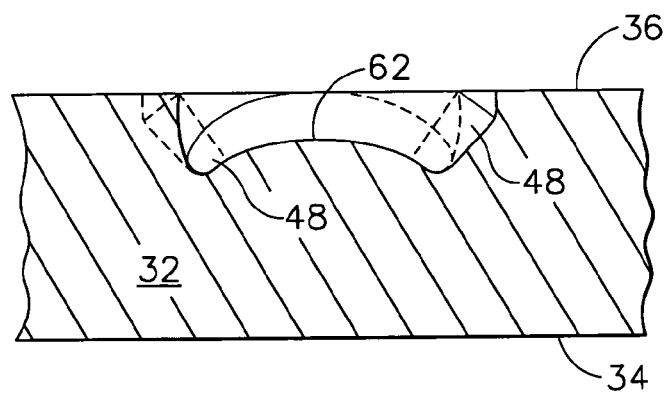
FIG. 10 is a lateral sectional view, like FIG. 4, of the chevron outlet illustrated in FIG. 9 and taken along line 10-10.

FIGS. 9 and 10 illustrate another embodiment of the chevron film cooling hole 60 in which the ridge 62 is outwardly convex laterally in depth between the two wing troughs 48.

In this embodiment, the convex ridge 62 is arcuate and generally triangular in profile, and diverges in the downstream direction between the inlet bore 44 and the junction of its downstream end with the outer surface 36.

The trailing edge of the ridge 62 blends flush with the outer surface 36 along a laterally arcuate downstream end of the chevron outlet, with the convex trailing edge being bowed upstream toward the inlet hole.

Like the preceding two embodiments, the curved form of the compound chevron film cooling hole 60 illustrated in FIGS. 9 and 10 also enjoys the advantages of the compound inclination angles B,C illustrated in FIG. 2 as the chevron outlet diverges aft from the inlet bore 44 differently inclined at the inclination angle A.

Figure 11:
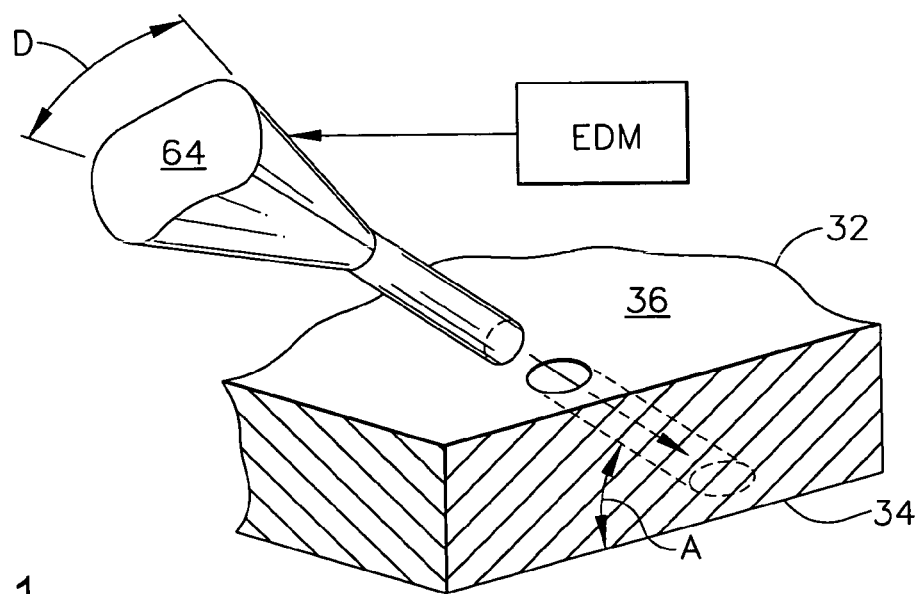
FIG. 11 is a schematic view, like FIG. 5, of another EDM electrode for forming the chevron hole illustrated in FIGS. 9 and 10.

FIG. 11 illustrates the corresponding EDM electrode 64 specifically configured for machining the curved chevron film cooling hole illustrated in FIGS. 9 and 10. The electrode includes a cylindrical stem configured for machining the corresponding cylindrical inlet bore 44 at the shallow inclination angle A through the wall 32. The base end of the electrode has opposite convex sides which diverge at the included angle D therebetween, with the lower face of the base end including a concave face for machining the complementary convex ridge 62 in this embodiment. The convex sides form complementary concave sides of the two troughs 48.

It is noted that the three EDM electrodes 52,58,64 illustrated in FIGS. 5,8, and 11 are similar in their coaxial alignment of the cylindrical inlet stems at one end and conical outlet cones at the opposite end. Those outlet cones are generally rectangular in cross section but suitably modified to include the two triangular planes in the lower surface of the FIG. 5 embodiment, the three triangular planes in the lower surface of the FIG. 8 embodiment, and the concave lower surface in the FIG. 11 embodiment.

The side walls in all three electrodes may similarly diverge at the included angle D, with the sidewalls in the FIG. 5 and 8 embodiments being generally straight or flat, whereas the sidewalls in the FIG. 11 embodiment being arcuate or convex.

The three electrodes may then be driven through the corresponding thin walls 32 at the shallow inclination angle A to form the corresponding symmetrical embodiments of the three compound chevron film cooling holes 38,54,60 disclosed above. Alternatively, the three electrodes may be driven through the wall with a compound inclination angle including the angle A in one plane and another shallow inclination angle in an orthogonal plane. In this case the resulting chevron outlet will be asymmetric.

The coaxial alignment of the opposite ends of the three electrodes permits additional divergence of the several chevron outlets illustrated in FIGS. 3,6,9 longitudinally outwardly from the corresponding cylindrical inlet bores 44, and generally coaxial therewith. Not only does the chevron outlet in these embodiments diverge in the downstream, aft direction due to the compound inclination angles B,C, but the outlet preferably also diverges laterally coaxially with the inlet bore 44 as it increases in width downstream therefrom as illustrated in FIG. 3 for example.

This complex 3-D configuration of the compound chevron outlets in the several embodiments disclosed above permits tailoring of the different portions thereof for maximizing film coverage with corresponding flow diffusion for maintaining flow attachment as the corresponding jet of cooling air is discharged through the film cooling hole onto the outer surface of the thin wall being protected thereby. In the three basic embodiments disclosed above, the intervening ridge between the two wing troughs 48 has different configurations from triangular to truncated to convex which form corresponding lower boundaries for the two wing troughs.

The outboard boundaries of the two wing troughs are defined by the sidewalls of the troughs which may be generally vertical or normal with the wall outer surface, or may be arcuate or inclined as desired for the particular design application.

Furthermore, the leading edge portion of each chevron outlet preferably also diverges downstream from the outlet end of the inlet bore 44, although in alternate embodiments it may be narrower in width to match that of the inlet bore itself.

In these various embodiments of the compound chevron holes, a substantial increase in film coverage due to the corresponding width E of the downstream end of the chevron outlets may be used to further increase efficiency of component cooling, and correspondingly increase efficiency of the engine.

For example, FIG. 1 illustrates an exemplary row of the chevron holes 38 being arranged colinear along the relevant span of the particular component wall 32. Since each chevron outlet 42 may have an increased width compared with conventional film cooling holes, fewer holes are required along the span, which corresponding reduces the collective flowrate thereof FIG. 6 illustrates another embodiment in which a pair of rows of the chevron holes 54 may be staggered from each other in span along the common wall 32. The chevron or delta configuration of the chevron outlets 42 permits convenient overlapping thereof for promoting a laterally continuous film of cooling air along the span of the wall within the coverage of the film cooling holes. In this way, the cooling air discharged from the individual chevron outlets can laterally overlap and enhance the lateral continuity of the collective film cooling layer discharged from the rows of holes.

As indicated above, these various exemplary embodiments of the chevron film cooling holes may be used in any component of the gas turbine engine in which film cooling holes are typically used. The compound chevron hole outlets are readily manufactured using the corresponding EDM electrode to introduce new diffusion capability in the hole outlets for improving film coverage and flow attachment of the discharged cooling air jets.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine wall comprising:
opposite inner and outer surfaces having a row of compound chevron film cooling holes extending longitudinally therethrough and diverging both longitudinally and laterally between an inlet at said inner surface and a chevron outlet at said outer surface; and
each of said chevron holes including a cylindrical inlet bore commencing at said inlet in said inner surface and terminating in a pair of wing troughs having a common ridge therebetween.

2. A wall according to claim 1 wherein:
said inlet bore is inclined between said inner and outer surfaces;
said wing troughs diverge longitudinally between said inlet bore and said outer surface, and laterally along said ridge; and
said chevron outlets increase in lateral width longitudinally along said ridge as said ridge decreases in depth to maximize diffusion with minimal flow separation of cooling air channeled through said chevron holes.

3. A wall according to claim 2 wherein:
said bore terminates below said outer surface; and said troughs decrease in depth along said ridge from said bore to said chevron outlet to blend with said wall outer surface.

4. A wall according to claim 3 wherein said troughs diverge from said ridge between said bore and said wall outer surface.

5. A wall according to claim 4 wherein said ridge is triangular laterally between said wing troughs, and straight longitudinally between said inlet bore and said outer surface.

6. A wall according to claim 4 wherein said ridge is flat laterally between said wing troughs.

7. A wall according to claim 6 wherein said flat ridge is triangular between said inlet bore and outer surface.

8. A wall according to claim 4 wherein said ridge is convex laterally between said wing troughs.

9. A wall according to claim 8 wherein said convex ridge diverges laterally between said inlet bore and said wall outer surface.

10. A wall according to claim 9 wherein said ridge blends flush with said outer surface along a laterally arcuate trailing edge.

11. A gas turbine engine wall comprising opposite inner and outer surfaces having a plurality of film cooling holes inclined longitudinally therethrough from an inlet at said inner surface through a pair of triangular troughs increasing in lateral width and depth along a common ridge being inclined with decreasing depth to a chevron outlet at said outer surface.

12. A wall according to claim 11 wherein each of said chevron holes includes an inlet bore commencing at said inlet in said inner surface and terminating at said troughs, and said troughs terminate at said outer surface aft of said ridge in a V-shaped trailing edge.

13. A gas turbine engine wall comprising:
opposite inner and outer surfaces having a row of compound chevron film cooling holes extending longitudinally therethrough and diverging both longitudinally and laterally between an inlet at said inner surface and a chevron outlet at said outer surface;
each of said chevron holes includes an inlet bore commencing at said inlet in said inner surface and terminating in a pair of wing troughs having a common ridge therebetween;
said inlet bore is inclined between said inner and outer surfaces; and
said wing troughs diverge longitudinally between said bore and outer surface, and laterally along said ridge.

14. A wall according to claim 13 wherein:
said bore terminates below said outer surface; and
said troughs decrease in depth along said ridge from said bore to said chevron outlet to blend with said wall outer surface.

15. A wall according to claim 14 wherein said troughs diverge from said ridge between said bore and said wall outer surface.

16. A wall according to claim 15 wherein said ridge terminates at said outer surface forward of said troughs terminating at said outer surface.

17. A wall according to claim 15 wherein said ridge is straight longitudinally between said bore and outer surface.

18. A wall according to claim 15 wherein said ridge is triangular laterally between said wing troughs.

19. A wall according to claim 15 wherein said ridge is flat laterally between said wing troughs.

20. A wall according to claim 19 wherein said flat ridge is triangular between said inlet bore and outer surface.

21. A wall according to claim 15 wherein said ridge is convex laterally between said wing troughs.

22. A wall according to claim 21 wherein said convex ridge diverges laterally between said inlet bore and said wall outer surface.

23. A wall according to claim 22 wherein said ridge blends flush with said outer surface along a laterally arcuate trailing edge.

24. A wall according to claim 15 wherein said chevron outlet diverges longitudinally outwardly from said inlet bore.

25. A wall according to claim 24 wherein said chevron outlet diverges laterally coaxially with said inlet bore.

26. A wall according to claim 13 wherein said ridge is inclined aft from said inlet bore, and said troughs are inclined aft from said ridge.

27. A wall according to claim 26 wherein said inlet bores are cylindrical.

28. A wall according to claim 27 wherein said chevron outlets increase in lateral width longitudinally along said ridge as said ridge decreases in depth to maximize diffusion with minimal flow separation of cooling air channeled through said chevron holes.

29. A wall according to claim 26 wherein said wing troughs are symmetrical along said ridges.

30. A wall according to claim 26 wherein said row of chevron holes is colinear.

31. A wall according to claim 26 further comprising a pair of rows of said chevron holes staggered in span along said wall, with said chevron outlets thereof overlapping each other for promoting a laterally continuous film of cooling air therefrom.

* * * * *